Feb. 17, 1953 — E. J. ROTH — 2,628,578
DOUGHNUT FORMER
Filed Oct. 4, 1948 — 2 SHEETS—SHEET 2
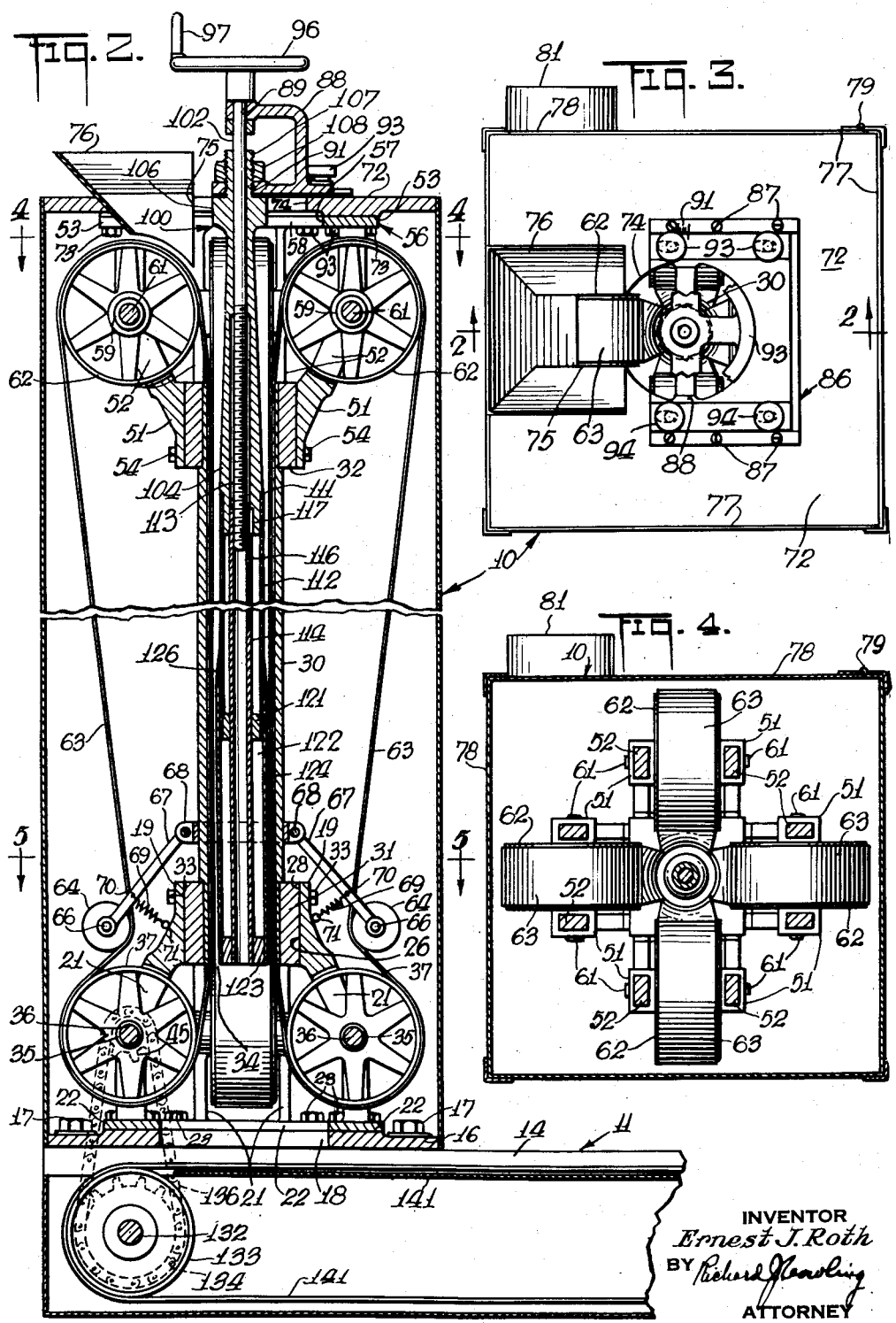
INVENTOR
Ernest J. Roth
BY Richard Rawling
ATTORNEY Patented Feb. 17, 1953

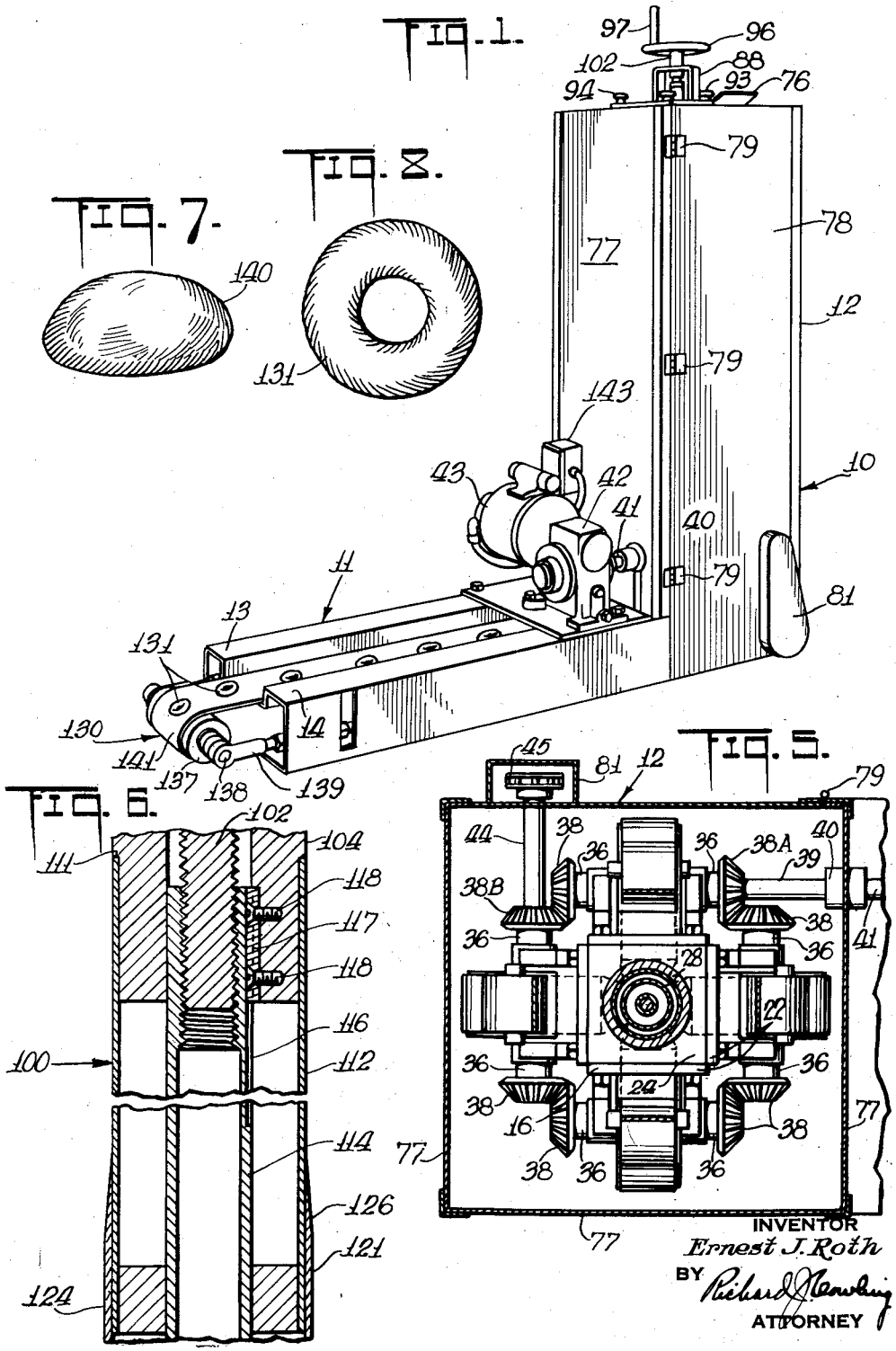

2,628,578

UNITED STATES PATENT OFFICE 2,628,578

DOUGHNUT FORMER

Ernest J. Roth, Rockleigh, N. J., assignor to Joe Lowe Corporation, New York, N. Y., a corporation of Delaware Application October 4, 1948, Serial No. 52,737

8 Claims. (Cl. 107—9)

The present invention relates to a method of and apparatus for forming doughnuts and the like, and it has specific relation to a method of and apparatus for forming doughnuts and the like from a ball or an irregular lump of dough by rolling the same around a fixed axial mandrel into a ring of the desired size and shape.

Heretofore, it has not been possible to manufacture yeast-raised or the so-called "bread" type doughnuts in large quantities cheaply and efficiently because such proofed dough cannot be cut or died-out into an annular ring of uniform size and weight on standard doughnut formers. The lightness, softness and varying density of the dough make it impossible of being processed in a conventional plunger type of doughnut former such as is used universally in the manufacture of the so-called "cake" type doughnut or cruller. When raised or yeast made dough is processed through the "cake" type of former, the annular dough formations are of such a great variance in size and weight that they cannot be sold in packages having a specified minimum weight.

With the present invention, the yeast-raised or "bread" type dough may be cut and formed into an irregular ball or lump in a conventional dough divider and weigher, such as is used in the weighing of dough for loaves of bread. The divided and weighed dough ball or lump may then be fed into the present apparatus, rolled and discharged automatically therefrom in the form of an annular ring having a standard size and weight. The ring may then be fried in deep fat, cooled, coated, packaged and/or wrapped in the conventional manner.

An object of the present invention is to provide a method of treating irregular lumps or balls of dough of a predetermined weight whereby they will be fashioned automatically into annular rings or uniform size and thickness, ready for frying in deep fat in the usual manner.

Another object of the invention is the provision of apparatus for rolling irregular lumps or balls of dough of a predetermined weight, whereby they will be formed automatically into an annular ring of a uniform size and thickness.

A further object of the invention is to provide suitable adjustments for the apparatus, whereby the uniform size and thickness of the annular rings may be maintained regardless of whether the dough is soft or stiff.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, wherein like numerals indicate like parts, in which:

Figure 1 is a perspective view of an apparatus constructed in accordance with the principles of the invention;

Figure 2 is a fragmentary vertical sectional view of the apparatus shown in Figure 1, the same having been taken substantially along the line 2—2 of Figure 3, looking in the direction of the arrows;

Figure 3 is a top plan view of the vertical section of the apparatus, with a portion of its adjustment wheel broken away for the sake of clearness;

Figure 4 is a cross-sectional view of the apparatus shown in Figure 2, the same having been taken substantially along the line 4—4 thereof, looking in the direction of the arrows;

Figure 5 is a second cross-sectional view of the apparatus shown in Figure 2, the same having been taken substantially along the line 5—5 thereof, looking in the direction of the arrows;

Figure 6 is an enlarged fragmentary vertical sectional view of the axial forming mandrel, illustrating in greater detail the structural features thereof;

Figure 7 is a persective view of an irregular lump or ball of dough formed on a conventional dough divider and weigher; and Figure 8 is a plan view of a dough ring which has been rolled on the apparatus, forming the subject matter of the invention, from the irregular lump or ball of dough shown in Figure 7.

Referring now to the drawings, and particularly to Figure 1 thereof, there is shown in perspective an apparatus 10 constructed in accordance with the principles of the invention. The apparatus 10 is substantially L-shaped, having an elongated horizontal base section 11 and an elongated vertical section 12. The horizontal base section 11 is substantially U-shape in cross-section with upwardly projecting arms 13 and 14. The elongated vertical section 12 is substantially square in cross-section.

Referring to Figure 2, the vertical section 12 is mounted on the top side of a square base plate 16, which is secured firmly by means of bolts 17, to one end of the upstanding arms 13 and 14 of the horizontal section 11. The base plate 16 is apertured axially to provide an opening 18. Four inverted U-shaped brackets 19, each having spaced downwardly projecting bifurcated legs 21 connected by a cross-bar 22, are secured to the top side of the plate 16 by bolts 23. The connecting portion 22 of the U-shaped brackets 19 form a square on their outer sides, as indicated at 24 in Figure 5, and their quadrant inner edges 26 form a circular opening 28 therethrough. The square plate 24 so formed is in vertical alignment with the base plate 16. The circular opening 28 is in vertical alignment with the opening 18 of the base plate 16.

An elongated tubular casing 30 has collars 31 and 32 welded or otherwise secured thereto, which collars are mounted adjacent the opposite ends thereof. The collar 31 is adapted to be mounted in the opening 28 formed by the brackets 19 by means of suitable bolts 33, which threadingly engage internally threaded recesses formed therein. It will be noted that the bore 34 of the casing 30 is in vertical alignment with the opening 18 of the base plate 16.

Each pair of legs 21 of each bracket 19 is drilled intermediate their ends in the same horizontal plane and in alignment, as indicated at 35. A shaft 36 is journalled in suitable bearings mounted in the drilled openings 35. A pulley wheel 37 is keyed to each shaft 36 between each pair of legs 21. Each shaft 36 has a beveled gear 38 keyed on opposite ends thereof, and the adjacent beveled gears 38 intermesh in driving arrangement. One of the beveled gears 38, which is designated in Figure 5 as 38-A, is provided with a suitable extension shaft 39, which is, in turn, connected through a conventional universal coupling 40 with a drive shaft 41 of a conventional reduction gear unit 42, which is, in turn, operatively connected with an electric motor 43. Another one of the beveled gears 38, which is indicated in Figure 5 as 38-B, is also provided with a suitable extension shaft 44, which projects outside of the vertical section 12, and has a sprocket wheel 45 keyed thereto.

Referring again to Figure 2, the upper collar 32 of the casing 30 has a series of four U-shaped brackets 51 mounted thereon. The brackets 51 are identical in construction with the brackets 19, having bifurcated legs 52 and a connecting cross-bar 53, which project upwardly instead of downwardly. The brackets 51 are mounted fixedly on the collar 32 by means of bolts 54. The cross-bars 53 of the several brackets 51 form a square plate 56, which is aligned vertically with the plates 16 and 24. Their quadrant inner edges 57 form a circular opening 58, which is spaced above the top of the casing 30. The opening 58 is in vertical alignment with the bore of the casing 30. Each pair of legs 52 of each bracket 51 is drilled intermediate their ends in the same horizontal plane and in alignment, as indicated at 59. A shaft 61 is journalled in suitable bearings mounted in the drilled openings 59. A pulley wheel 62 is keyed to each shaft 61 between the legs 52 of each bracket 51.

In the construction above described, it will be apparent that the pulley wheels 37 and 62 are in vertical alignment. A fabric or cloth belt 63 is mounted over each vertically aligned pair of pulley wheels 37 and 62 with its inner sides operating inside of the bore 34 of the tubular casing 30 contiguously to the surface thereof. The four belts 63 are operated in an overlapping position, as best shown in Figure 4, so that the bore 34 of the casing 30 is completely covered with a movable surface. The belt adjacent the dough receiving trough overlaps both lateral belts, and the lateral belts overlap the back belt, which is the belt diagrammatically opposite the dough receiving trough. Each belt 63 is provided with suitable means in the form of a spring tensioned idler pulley 64 to keep it taut at all times. The idler pulley 64 is journalled on a shaft 66 mounted fixedly between the ends of the U-shaped bracket 67, which is, in turn, mounted pivotally to a supporting bracket 68 welded or otherwise secured to the sides of the casing 30. A spring 69 connected at one end, as indicated at 70, and connected at the other end to the legs 21 of the bracket 19, as indicated at 71, serves to draw the idler pulley 64 inwardly to maintain tension on its belt 63.

A top plate 72 is mounted on the upper side of the cross-bars 53 by means of bolts 73. The top plate 72 is provided with an axial opening 74, which is aligned axially with the bore 34 of the casing 30. A second opening 75 is provided through one side of the plate 72 for mounting a receiving trough 76 therethrough, which receiving trough has upwardly and outwardly extending sides.

The vertical section 12 is entirely enclosed on three sides with sheet metal plates 77, which are welded or otherwise secured to the plates 16, 24 and 56. One side of the section 12 is provided with a door 78, which is hinged, as indicated at 79, to provide ready access to the inside thereof. A guard 81 is provided in the door 79 to protect the operator from the chain drive of the lower conveyor hereinafter to be described.

A trackway 86 is mounted on the top side of the top plate 72 on opposite sides of the axial opening 74 by means of machine screws 87. The trackway 86 is in alignment with the receiving trough 76, and is adapted to receive slidingly an upwardly extending spider or yoke 88, which is apertured, as indicated at 89 and 91, to receive and support a depending mandrel 100 adapted to extend axially into the bore 34 of the casing 30. The yoke 88 is provided with locking bolts 93 and 94 to secure it in a fixed position in the trackway 86, which is provided with a scale 91 to facilitate fixing its position with respect of the longitudinal axis of the casing 30.

The mandrel 100 is constructed so as to be extensible, and consists of a rod 102 projecting through the apertures 89 and 91 of the yoke 88, having a fixed wheel 96 mounted on the upper end thereof provided with a suitable manipulating handle 97. A sleeve 104 is mounted on the lower end of the rod 102, and has an enlarged head 106 and externally threaded collar 107 adapted to extend through the lower opening 91 in the yoke 88. A nut 108 is adapted to engage the threads of the collar 107 and secure the mandrel 100 in a fixed position with respect of the yoke 88. The sleeve 104 tapers outwardly as it extends downwardly, and is recessed circumferentially adjacent its lower end, as indicated at 111, to receive an extension sleeve 112, which is sweated, welded or otherwise secured fixedly thereto. The lower end of the rod 102 is threaded and the corresponding part of the bore of the sleeve 104 is enlarged, as indicated at 113 and best shown in Figure 2. A tubular rod 114 of a diameter adapted to fit slidingly within the enlarged bore 113 of the sleeve 104, having its upper end threaded internally, engages the threaded end of the rod 102 to form an extension therefor. The tubular rod 114 is provided with a vertical keyway along one side, as indicated at 116. A key 117 is mounted fixedly on the inside of the sleeve 104 at the lower end thereof, by means of suitable machine screws 118. Obviously, when the rod 102 is rotated clockwise by the handle 97, the tubular rod 114 is drawn upwardly on the threads of the rod 102, the key 117 operating in the keyway 116, preventing the same from turning with the rod 102. When the rod 102 is rotated counterclockwise, the tubular rod 114 will be moved downwardly on the threads of the rod 102.

The extension sleeve 112 is mounted fixedly on the end of the sleeve 104 in the recess 111. An annular spacer 121 is mounted fixedly in the lower end of the extension sleeve 112, and has an axial bore 122 adapted to permit the tubular rod 114 to pass therethrough. A second annular spacer 123 is mounted fixedly adjacent the lower end of the tubular rod 114, and it has an outer sleeve 124 welded thereto, which extends upwardly and telescopically over the lower end of the extension sleeve 112. The upper end of the outer sleeve 124 is tapered, as indicated at 126, in Figure 2. The movement of the tubular rod 114 over the threads of the rod 102 will be limited by the length of the keyway 116. It will thus be apparent that the length of the axial mandrel 100 can be adjusted within certain limits as desired merely by rotation of the wheel 96.

The horizontal base section 11 of the apparatus provides means for supporting a horizontal conveyor 130 for conveying the new dough forms 131 discharged from the bottom of the vertical casing 30 to a conventional proofing cabinet (not shown). It has a shaft 132 journalled in bearings mounted in the back of the frame structure 11, and has a pulley wheel 133 keyed thereto. (See Figure 2.) A sprocket wheel 134 is also keyed to the outer end of said shaft. A chain 136 connects the sprocket wheel 134 with the driving sprocket wheel 45 keyed to the extension shaft 44. An idler pulley wheel 137 is journalled on a shaft 138 mounted in adjustable brackets 139 extending transversely of the forward or discharge end of the base section 11. A conveyor belt 141 operates over the pulley wheels 133 and 137.

In describing the operation of the apparatus, it will be assumed that the electric motor 43 has been started by turning on its control switch 143. The four belts 63 are all being driven downwardly through the bore 34 of the tubular casing 30 contiguous to its internal surface, and the mandrel 100 is projecting inwardly of the bore 34 slightly off-center towards the receiving trough 76.

The dough lumps 140 for making the dough rings 131 are formed and weighed on a conventional dough divider and weigher (not shown), such as is used commercially in the manufacture of large quantities of bread. The dough lumps 140, which are substantially round or oval shaped, consist of dough, having a spongy, soft and varying texture. It is well recognized, however, that different dough batches have different consistencies, even when made according to the same formula, and that suitable adjustments must be made therefor. It must be possible to regulate the speed of the belts 63, and this may be accomplished in any suitable manner, as by a variable speed reduction gear, etc. If the speed of the belts 63 is too fast, they will have a tendency to tear the dough 140 when rolling it into an annular dough ring 131. If the speed of the belts 63 is too slow, it will not affect the formation of dough rings, but merely slow up production.

It is quite obvious that soft dough will flow around the mandrel 100 much faster than a stiff dough. Therefore, some means of adjustment must be made for a difference in the rolling time of the dough 140 passing through the apparatus. This can be accomplished by making the mandrel 100 extensible. When a stiff dough is being rolled, the mandrel 100 may be extended downwardly. By extending the length of the mandrel 100, the belts 63 will have more time to work the dough therearound and into a dough ring. Obviously, the reverse is true, and, when a very soft dough is being processed, the mandrel 100 may be shortened, thereby reducing the working time of the dough.

Anyone skilled in the baking art will readily appreciate that no definite tables can be given for working different dough batches, because no two bakers ever make the same identical dough, following the same formula and using the same ingredients. The proper off-center setting of the mandrel, the length of the mandrel and the speed of the belts are all adjustments that must be made by trial runs of dough lumps through the apparatus until perfectly formed dough rings are produced thereby. The mandrel must be off-centered toward the feeding trough in order to produce a dough ring of even cross-section throughout, and the amount of off-centering will depend upon the formula used in making the dough batch. This off-centering is conveniently accomplished in the present apparatus by having a radially adjustable yoke for supporting the mandrel, and providing a suitable scale for indicating the degree of off-center. Obviously, such off-centering might be accomplished in other ways, such as, for example, making the mandrel elliptical on the side toward the feeding trough.

Although I have only described in detail one embodiment of the invention, it will be readily apparent to those skilled in the art that many further modifications may be made therein without departing from the spirit thereof or from the scope of the appended claims.

What I claim is:

1. A doughnut former comprising an elongated tubular member having a bore therethrough, belt guiding means for supporting a plurality of belts, a plurality of endless belts mounted over said guiding means with one side of each of said belts operating contiguously over the inside surface of said bore, a mandrel extending into one end of said bore and eccentrically of its longitudinal axis, and means for operating said belts in the direction in which said mandrel extends into said bore.

2. A doughnut former comprising an elongated tubular member having a circular bore therethrough, belt guiding means mounted on said tubular member adjacent opposite ends thereof for supporting a plurality of belts, a plurality of endless belts mounted over said guiding means having one side operating contiguously over the inside surface of said bore, a mandrel extending downwardly from the top of said tubular member substantially through said bore, means for adjusting the position of said mandrel with respect of the longitudinal axis of said bore, and means for operating said belts downwardly through said bore.

3. A doughnut former comprising an elongated vertical tubular member having a circular bore extending therethrough, belt guiding means mounted on opposite ends of said tubular member for supporting a plurality of belts, a plurality of endless belts mounted over said guiding means having one side operating in overlapping arrangement over the entire inside surface of said bore, an extensible mandrel projecting into said bore from the top of said tubular member, means for varying the distance to which said mandrel extends into said bore, and means for synchronously operating said belts downwardly through said bore.

4. A doughnut former comprising an elongated vertical tubular member having a circular bore extending therethrough, belt guiding means mounted adjacent opposite ends of said member for supporting a plurality of belts, a plurality of belts mounted over said guiding means and operating against the inside surface of said bore, an extensible mandrel projecting downwardly into said bore and eccentrically of its longitudinal axis, means for varying the length of said mandrel, means for changing the eccentric position of said mandrel with respect of the longitudinal axis of said bore, and means for synchronously operating said belts downwardly within said bore.

5. A doughnut former comprising an elongated vertical tubular member having a circular bore extending therethrough, spaced belt guiding means mounted on said member for supporting a plurality of belts, a plurality of endless belts mounted over said spaced guiding means for operating contiguously over the entire inner surface of said bore, an extensible mandrel projecting downwardly into said bore and eccentrically with respect of the longitudinal axis thereof, said mandrel increasing in diameter as it extends inwardly of said bore, means for varying the length of said mandrel, and means for synchronously operating said belts downwardly through said bore.

6. A doughnut former comprising an elongated vertical tubular member having a circular bore extending therethrough, belt guiding means for supporting a plurality of belts, a plurality of endless belts mounted over said guiding means and having one side operating contiguously over the surface of said bore, a mandrel extending into said bore from the top thereof, means for off-centering said mandrel with respect of the longitudinal axis of said bore, means for operating synchronously said belts downwardly through said bore, and means for receiving and conveying away the dough forms discharged from the lower end of said bore.

7. A doughnut former comprising an elongated vertical tubular member having a circular bore extending therethrough, belt guiding means for supporting a plurality of belts, a plurality of belts mounted over said guiding means to operate contiguously over the inner surface of said bore, a dough receiving chute mounted adjacent one side and above the top of said bore, a mandrel extending into said bore from the top side thereof, means for radially moving said mandrel to various positions between the longitudinal axis of said bore and said dough receiving chute, and means for synchronously operating said belts downwardly through said bore.

8. A doughnut former comprising an elongated vertical tubular member having a circular bore extending therethrough, a dough receiving chute mounted adjacent one side and above the top of said bore, belt guiding means for supporting a plurality of belts, a plurality of belts mounted over said guiding means having one side of each belt operating contiguously over the surface of said bore, the belt adjacent the dough receiving chute overlapping the lateral belts and the belt diametrically opposite said chute being overlapped by said lateral belts, a mandrel extending into said bore from the top thereof, and means for operating synchronously said belts downwardly through said bore.

ERNEST J. ROTH.

REFERENCES CITED

The following references are of record in the file of this patent:

UNITED STATES PATENTS

| Number | Name | Date |
|---|---|---|
| 1,242,753 | Aesch Bach | Oct. 9, 1917 |
| 1,252,765 | Aesch Bach | Jan. 8, 1918 |
| 1,552,430 | Gendler | Sept. 8, 1925 |
| 1,755,921 | Gendler | Apr. 22, 1930 |
| 2,159,246 | Beyer | May 23, 1939 |
| 2,246,949 | Parsons | June 24, 1941 |
| 2,263,490 | Fox | Nov. 18, 1941 |